(12) United States Patent
Gregson et al.

(10) Patent No.: US 11,993,821 B2
(45) Date of Patent: May 28, 2024

(54) CO-CRYSTALLIZED SWEETENERS

(71) Applicant: FIRMENICH SA, Geneva (CH)

(72) Inventors: Christopher M. Gregson, Princeton, NJ (US); Matthew P. Sillick, Belle Mead, NJ (US); Jérôme Barra, Geneva (CH); Angela Di Pietro, Geneva (CH)

(73) Assignee: Firmenich SA, Satigny (CH)

( * ) Notice: Subject to any disclaimer, the term of this patent is extended or adjusted under 35 U.S.C. 154(b) by 61 days.

(21) Appl. No.: 16/055,266

(22) Filed: Aug. 6, 2018

(65) Prior Publication Data

US 2018/0363074 A1  Dec. 20, 2018

Related U.S. Application Data

(63) Continuation of application No. 14/654,841, filed as application No. PCT/EP2013/076635 on Dec. 16, 2013.

(60) Provisional application No. 61/745,412, filed on Dec. 21, 2012.

(51) Int. Cl.
| | |
|---|---|
| C13B 50/00 | (2011.01) |
| A21D 2/18 | (2006.01) |
| A23C 9/13 | (2006.01) |
| A23C 9/156 | (2006.01) |
| A23G 3/36 | (2006.01) |
| A23G 4/06 | (2006.01) |
| A23L 2/60 | (2006.01) |
| A23L 5/00 | (2016.01) |
| A23L 27/30 | (2016.01) |
| A23L 27/60 | (2016.01) |
| A23L 29/30 | (2016.01) |
| A23P 10/20 | (2016.01) |
| A23P 10/22 | (2016.01) |

(52) U.S. Cl.
CPC ............ *C13B 50/002* (2013.01); *A21D 2/181* (2013.01); *A23C 9/1307* (2013.01); *A23C 9/156* (2013.01); *A23G 3/36* (2013.01); *A23G 4/06* (2013.01); *A23L 2/60* (2013.01); *A23L 5/00* (2016.08); *A23L 27/31* (2016.08); *A23L 27/33* (2016.08); *A23L 27/60* (2016.08); *A23L 29/30* (2016.08); *A23P 10/20* (2016.08); *A23P 10/22* (2016.08); *C13B 50/004* (2013.01); *A23V 2002/00* (2013.01); *A23V 2250/628* (2013.01); *A23V 2300/31* (2013.01); *A23V 2300/36* (2013.01)

(58) Field of Classification Search
CPC ........ C13B 50/002; A23L 29/30; A23L 27/33; A23L 2/60; A23P 10/20
See application file for complete search history.

(56) References Cited

U.S. PATENT DOCUMENTS

| | | | |
|---|---|---|---|
| 4,362,757 A | 12/1982 | Chen | |
| 6,214,402 B1 | 4/2001 | Fotos | |
| 8,609,173 B2 * | 12/2013 | Shigemura | .............. A23L 29/30 |
| | | | 426/548 |
| 2010/0034945 A1 | 6/2010 | Moreno | |
| 2011/0236551 A1 * | 9/2011 | Hammond | ............ C13B 30/021 |
| | | | 426/549 |
| 2012/0041078 A1 | 2/2012 | Tachdjian et al. | |
| 2012/0282377 A1 | 11/2012 | Upreti et al. | |

FOREIGN PATENT DOCUMENTS

| | | |
|---|---|---|
| CN | 101765376 A | 6/2010 |
| CN | 102170797 A | 8/2011 |
| WO | 2000015050 | 3/2000 |
| WO | 2010014666 | 2/2010 |
| WO | 2010014813 | 2/2010 |
| WO | 2011116143 | 9/2011 |
| WO | 2012001547 | 1/2012 |
| WO | 2012164383 A1 | 12/2012 |

\* cited by examiner

*Primary Examiner* — Jeffrey P Mornhinweg
(74) *Attorney, Agent, or Firm* — Robert S. Dailey

(57) ABSTRACT

Sweeteners made from the co-crystallization of 3-(4-amino-2,2-dioxide-1H-benzo[c][1,2,6]thiadiazin-5-yloxy)-2',2'-dimethyl-N-propylpropanamide (Compound I) having the structure:

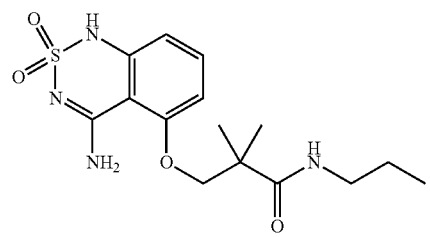

or salt thereof, with sugar in various ratios. The sugar co-crystallized sweeteners are very soluble in water and have no dusting problems.

15 Claims, 2 Drawing Sheets

CO-CRYSTALLIZED SWEETENERS

FIELD

The present application is a Continuation of U.S. Non-Provisional patent application Ser. No. 14/654,841, filed on Jun. 22, 2015, which is a National Stage Entry of International Patent Application Serial No. PCT/EP2013/076635, filed on Dec. 16, 2013, claiming priority to U.S. Provisional Patent Application Ser. No. 61/745,412, filed on Dec. 21, 2012, the entire contents of which are hereby incorporated by reference in their entirety.

FIELD

Disclosed herein is a delivery system for a sweet receptor modulator and a sugar. Also disclosed is a process for producing a water-soluble, non-dusting, sugar co-crystallized 3-(4-amino-2,2-dioxide-1H-benzo[c][1,2,6]thiadiazin-5-yloxy)-2',2'-dimethyl-N-propylpropanamide (Compound I) composition, as well as beverages, fluid dairy products, condiments, baked goods, frostings, bakery fillings, candy, chewing gum or table-top sweeteners prepared with the sugar co-crystallized 3-(4-amino-2,2-dioxide-1H-benzo[c][1,2,6]thiadiazin-5-yloxy)-2',2'-dimethyl-N-propylpropanamide (Compound I) compositions and methods of preparing the same.

BACKGROUND

The use of sweet receptor modulators requires consideration of the ability to deliver the modulator and also its solubility. Thus, effective means for delivering sweet receptor modulators in desired compositions would be very useful. In particular, it is highly desirable, to provide a means to hasten the aqueous dissolution rate of a poorly soluble sweet receptor modulator such as Compound I. Moreover, it is also desirable to achieve a uniform blend of sucrose and Compound I to avoid demixing, and to prevent unsightly flocks of sweetness enhancer from forming when a powdered beverage that contains the compositions is added to water.

Embodiments described below meet at least one of these, and other, needs of the industry by providing a sugar co-crystallized with Compound I.

SUMMARY

Provided herein is the co-crystallization of 3-(4-amino-2,2-dioxide-1H-benzo[c][1,2,6]thiadiazin-5-yloxy)-2',2'-dimethyl-N-propylpropanamide (Compound I) having the structure:

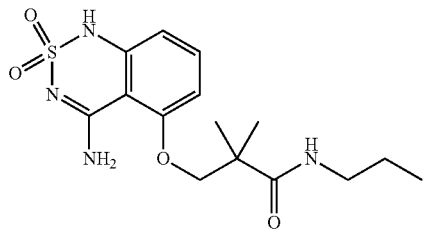 [SMILES: CCCNC(=O)C(C)(C)COc1cccc2c1C(N)=NS(=O)(=O)N2]

or salts thereof with sugar in various ratios. In addition, embodiments provided herein provide for the uniform dispersion of Compound I in any application. ". The sugar co-crystallized sweetener composition provided herein comprises sugar and a sweetener enhancer such as Compound I. Compositions provided herein can be used, for example, as a sweetener for incorporation in processed foods and beverages or as a table-top sweetener.

Further provide herein is a composition comprising a mixture of sugar and from about 0.5% to about 50%, of the total weight of the mixture, Compound I having the structure:

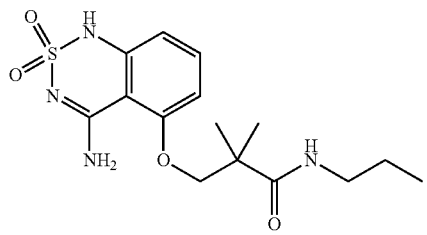 [SMILES: CCCNC(=O)C(C)(C)COc1cccc2c1C(N)=NS(=O)(=O)N2]

wherein the mixture has been formulated so that the time that 50% of Compound 1 in the mixture dissolves in water is faster than the time Compound I, provided in the same amount in a simple mixture of Compound I and sugar, dissolves in water.

In another embodiment, a mixture of sugar and 0.5 to less than 10%, of the total weight of the solution, Compound I wherein Compound I in the mixture dissolves in water in less than or equal to about five minutes, particularly Compound 1 dissolves in water in less than 2 minutes, more particularly, in less than 2 seconds.

In another embodiment of the sugar co-crystallized sweetener composition provided herein, Compound I and is present in an amount from 0.001% to 50% by weight of the final product. In yet another embodiment, the concentration range of Compound I is from 0.001% to 5%. In yet another embodiment, the concentration range of Compound I is from 0.001% to 2.5%.

Without being bound to theory, it is believed that the sugar co-crystallized with Compound I composition may comprise agglomerates.

In yet another embodiment provided herein, the sugar co-crystallized Compound I composition additionally comprises another sweetener, which is selected from a natural sweetener, a high intensity sweetener, or a mixture thereof.

A process for preparing a sugar co-crystallized sweetener composition is also disclosed herein. This process comprises mixing sugar with water with agitation, heating the resultant mixture to form a hot concentrated sucrose/water syrup of; incorporating the 3-(4-amino-2,2-dioxide-1H-benzo[c][1,2,6]thiadiazin-5-yloxy)-2',2'-dimethyl-N-propylpropanamide (Compound I) into the syrup to form a uniform dispersion, removing the mixture from the heat and allowing the mixture to cool with vigorous agitation; and sieve screening the resulting agglomerates.

In another embodiment, the process comprises mixing the sugar with water with agitation and heating the resulting mixture to about 120°-130° C. to form a hot concentrated sucrose/water syrup of approximately 95 to 98 brix; incorporating the 3-(4-amino-2,2-dioxide-1H-benzo[c][1,2,6]thiadiazin-5-yloxy)-2',2'-dimethyl-N-propylpropanamide (Compound I) into the syrup to form a uniform dispersion, removing the mixture from the heat and allowing the mixture to cool with vigorous agitation; and sieve screening the resulting agglomerates to control granulometry.

Also disclosed is a method of sweetening beverage, dessert, condiment, candy, chewing gum and table-top sweetener compositions by adding a sugar co-crystallized Compound I composition in an amount effective to sweeten such a composition.

The sugar co-crystallized Compound I compositions can be included in various edible compositions such as beverages, fluid dairy products, condiments, baked goods, frostings, bakery fillings, candy and chewing gum with the sugar co-crystallized sweetener composition being present in an amount effective to sweeten the compositions.

The sugar co-crystallized Compound I compositions can also be provided in the form of a table-top sweetener.

DETAILED DESCRIPTION

Figure 1:
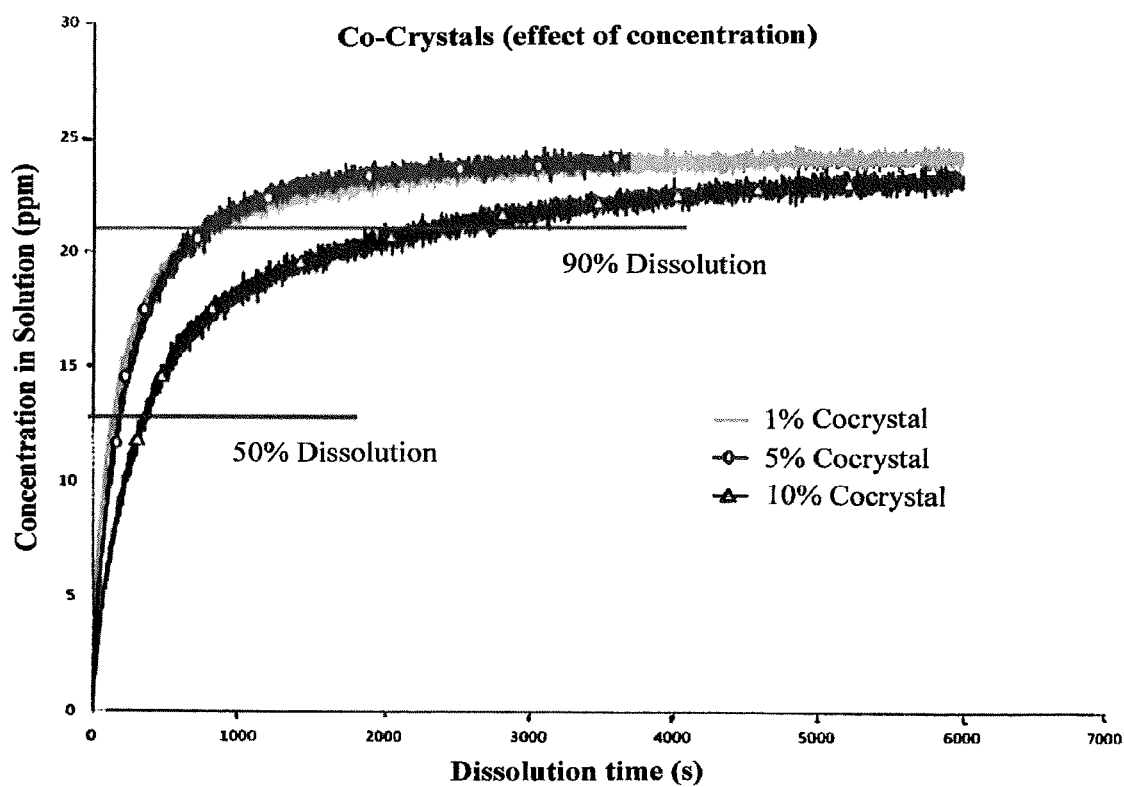
FIG. 1 is a graph showing the dissolution profiles of Compound I co-crystals of different concentrations.

The term "sugar" is used to refer to sucrose, fructose or glucose in a dry or syrup form.

Compositions provided herein use 3-(4-amino-2,2-dioxide-1H-benzo[c][1,2,6]thiadiazin-5-yloxy)-2',2'-dimethyl-N-propylpropanamide (Compound I) having the structure:

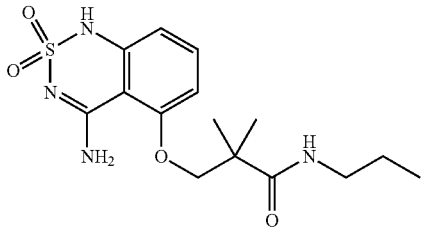 [SMILES: CCCNC(=O)C(C)(C)COc1cccc2c1C(N)=NS(=O)(=O)N2]

Salts and complexes of Compound I are also suitable for such uses.

One aspect provided herein is a process for preparing a sugar co-crystallized with 3-(4-amino-2,2-dioxide-1H-benzo[c][1,2,6]thiadiazin-5-yloxy)-2',2'-dimethyl-N-propylpropanamide (Compound I).

In one embodiment, a first step of this process, a hot concentrated sucrose/water syrup of approximately 95 to 98 brix is obtained by mixing sugar with water with agitation and then heating the syrup with agitation to remove water, through any conventional means. A commercially available sugar syrup can also be used to prepare the hot concentrated sucrose/water syrup of approximately 95 to 98 brix. The resulting viscous liquid allows Compound I to be dispersed within the syrup.

In a particular embodiment, the resulting syrup is maintained at a temperature not less than about 120° C.

In another aspect, the resulting syrup is maintained at a temperature in order to prevent premature crystallization.

In a further embodiment, the solids content of the resulting syrup is from 95-98% by weight of the syrup.

In another aspect, provided here is a second step of the above identified process where, the poorly water-soluble Compound I is incorporated into the syrup to form a uniform dispersion to avoid "hot spots." A uniform mixture also facilitates wetting and dissolution of Compound I when the final product is placed into water.

In one embodiment, a dry premix comprising 3-(4-amino-2,2-dioxide-1H-benzo[c][1,2,6]thiadiazin-5-yloxy)-2',2'-dimethyl-N-propylpropanamide (Compound I) or salt thereof and sugar is prepared. The weight ratio of Compound I to sugar in this premix ranges from about 0.001:1 to about 1:1. Other components, such as flavors or other high potency sweeteners in extremely small amounts may also be added, so long as the amount added does not adversely affect the overall taste of the sugar co-crystallized sweetener composition. For example, a surfactant such as, but not limited to, lecithin, monoglycerides, diglycerides, CITREM® and DATEM®, a solvent modifying agent such as an acid or base can be added to influence pH or some other solubility parameter of the solvent in the dissolution zone, or to impact the crystal form of the poorly water soluble flavor such as compound I. Optionally a second flavouring ingredient can be added to impart a desired taste.

In a further process step, a predetermined amount of the premix is added to the syrup with vigorous mechanical agitation or impact beating within a suitable crystallization zone, such as an inline homogenizer, a Hobart Mixer or Turbulizer.

Alternatively, the concentrated syrup may be added to a predetermined amount of the premix and mixed in a similar manner. The amount of premix added can be varied in order to result in final products with varying 3-(4-amino-2,2-dioxide-1H-benzo[c][1,2,6]thiadiazin-5-yloxy)-2',2'-dimethyl-N-propylpropanamide (Compound I) content. In one particular embodiment provided herein, 3-(4-amino-2,2-dioxide-1H-benzo[c][1,2,6]thiadiazin-5-yloxy)-2',2'-dimethyl-N-propylpropanamide (Compound I) and is present in an amount from 0.001% to 50% by weight of the final product. In another embodiment provided herein, Compound I is present in an amount from 0.001% to 5% by weight of the final product. In yet another embodiment, Compound I is present in an amount from 0.001% to 2.5% by weight of the final product. After the addition of the premix, the sugar syrup is removed from the heat. During crystallization, it is desirable to remove the heat to prevent overheating within the crystallization zone. The heat of crystallization can be removed or dissipated by indirect heat exchange, e.g., by surrounding the crystallization zone with a water jacket, or by forced air flow through the beater-crystallizer, e.g., with a vapor separator.

In a further step of the process, the mixture is cooled quickly with vigorous agitation. This agitation step is essential as it initiates the exothermic crystallization of sucrose. Simultaneously, water is boiled off and agglomerates of fondant sized sucrose crystals and Compound I are formed. Agitation is continued until the mixture is transformed, crystallized and agglomerated. When the mixture reaches the relatively dry agglomerated state, the resulting product is a homogeneous blend of the co-crystallized sugar and 3-(4-amino-2,2-dioxide-1H-benzo[c][1,2,6]thiadiazin-5-yloxy)-2',2'-dimethyl-N-propylpropanamide (Compound I).

The latent heat of crystallization is generally sufficient to evaporate the moisture so the sugar co-crystallized 3-(4-amino-2,2-dioxide-1H-benzo[c][1,2,6]thiadiazin-5-yloxy)-2',2'-dimethyl-N-propylpropanamide (Compound I) composition is substantially dry. If desired, the sugar co-crystallized Compound I composition may be further dried. The physical structure of the sugar co-crystallized 3-(4-amino-2,2-dioxide-1H-benzo[c][1,2,6]thiadiazin-5-yloxy)-2',2'-dimethyl-N-propylpropanamide (Compound I) composition is highly dependent on the rate and temperature of agitation and crystallization, and on the degree of sugar transformation. Generally, the less time the mixture spends at high temperature, the better.

In a yet further step of the process, the granulometry of the resulting agglomerates is controlled by sieve screening. Control of granulometry by sieving is essential to ensure that the agglomerates can be of a desired particle size. For example, this step removes large aggregates so that the product to the unaided eye can have the appearance of table sugar.

The sugar co-crystallized 3-(4-amino-2,2-dioxide-1H-benzo[c][1,2,6]thiadiazin-5-yloxy)-2',2'-dimethyl-N-propylpropanamide (Compound I) compositions provided herein are generally in the form of aggregates or agglomerates of sucrose crystals intimately associated with the 3-(4-amino-2,2-dioxide-1H-benzo[c][1,2,6]thiadiazin-5-yloxy)-2',2'-dimethyl-N-propylpropanamide (Compound I) sweeteners. The agglomerates form a loose, lacy network bonded together at their interfaces by point contact. Accordingly, aqueous liquid can rapidly penetrate the porous cluster of agglomerates and free each of the particles making up the agglomerates. The particles thus become readily dispersed and/or dissolved in the aqueous liquid.

In a sugar co-crystallized Compound I composition provided herein, the 3-(4-amino-2,2-dioxide-1H-benzo[c][1,2,6]thiadiazin-5-yloxy)-2',2'-dimethyl-N-propylpropanamide (Compound I) sweetener is incorporated as an integral part of the sugar matrix and there is no tendency for the 3-(4-amino-2,2-dioxide-1H-benzo[c][1,2,6]thiadiazin-5-yloxy)-2',2'-dimethyl-N-propylpropanamide (Compound I) sweetener to separate or settle out during handling, packaging or storage. The resulting product is granular, free-flowing, non-caking and is readily and uniformly dispersed or dissolved in water.

Some embodiments comprised herein provide enhanced delivery characteristics.

Some embodiments comprised herein provide for the uniform dispersion of Compound I in any application and therefore avoid "hot spots" or areas of agglomerates.

Compositions of the sugar co-crystallized 3-(4-amino-2,2-dioxide-1H-benzo[c][1,2,6]thiadiazin-5-yloxy)-2',2'-dimethyl-N-propylpropanamide (Compound I) provided herein are suitable for use in any food to replace natural sweeteners, as well as other high intensity sweeteners, normally used as sweeteners. The sugar co-crystallized Compound I can be administered in a dry form, e.g., in powdered beverages, frosted cereals or master batches (i.e. concentrated Compound I enhancer/sucrose mixtures which are further diluted by customers who prepare reduced-sugar food stuffs).

The term "food" as used herein includes, for example, beverages, fluid dairy products, condiments, baked goods, frostings, bakery fillings, candy and chewing gum.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra-high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts. Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like. Bakery fillings include, without limitation, low or neutral pH fillings, high, medium or low solids fillings, fruit or milk based (pudding type or mousse type) fillings, hot or cold make-up fillings and nonfat to full-fat fillings.

Sweetened food composition, such as those described above, are obtained by including therein a sweetening effective amount of the sugar co-crystallized 3-(4-amino-2,2-dioxide-1H-benzo[c][1,2,6]thiadiazin-5-yloxy)-2',2'-dimethyl-N-propylpropanamide (Compound I) composition to sweeten the food composition.

Determination of the amount of sugar co-crystallized 3-(4-amino-2,2-dioxide-1H-benzo[c][1,2,6]thiadiazin-5-yloxy)-2',2'-dimethyl-N-propylpropanamide (Compound I) composition to be added to the food composition can be readily determined by one of ordinary skill in the art.

The sugar co-crystallized sweetener composition can be used for this purpose alone or in combination with known bulking agents. Suitable bulking agents include, but are not limited to, dextrose, maltodextrin, lactose, inulin, polyols, polydextrose, cellulose and cellulose derivatives and organic acids including, but not limited to, citric acid and malic acid. Such a product may be suitable for use especially for table-top sweeteners and powdered soft drinks. A table-top sweetener comprising the present sugar co-crystallized sweetener composition may also include any other ingredients commonly present in table-top sweeteners in order to tailor the taste of the product to a specific end use. A table-top sweetener comprising the present sugar co-crystallized sweetener composition may take any known form. Suitable forms include, but are not limited to, sachets including the sweetener in powder or granular form, tablets, liquid sweeteners, and jar, pouches, pocket or other forms in which the sweetener may be measured in, for example, spoon for spoon form.

The sugar co-crystallized 3-(4-amino-2,2-dioxide-1H-benzo[c][1,2,6]thiadiazin-5-yloxy)-2',2'-dimethyl-N-propylpropanamide (Compound I) compositions can also include known natural sweeteners as well as other high intensity sweeteners. Sweeteners that may be employed include, without limitation, aspartame, acesulfame-K, sucralose, saccharin, alitame, cyclamates, stevia derivatives, thaumatin, sucrose (liquid and granulated), high fructose corn syrup, high conversion corn syrup, crystalline fructose, glucose (dextrose), polyol sugar alcohols, invert sugar and mixtures thereof.

Additional embodiments of the compositions disclosed herein and the use thereof are also contemplated, wherein the compositions consist of or consist essentially of the recited components.

EXAMPLES

Embodiments will now be described in further detail by way of the following examples. These examples are intended as an illustration of certain embodiments, and no limitation is implied.

Example 1: Co-Crystal of 1% Compound I and 99% Sucrose 20 g of granular sucrose (Domino Foods) were dissolved in 14 mL of hot deionised water within a 50 mL glass beaker. The resulting syrup was boiled in a microwave oven to reduce the moisture content. Periodically the syrup was removed from the oven and stirred with a thermometer to liberate bubbles and to monitor temperature. When the syrup reach a temperature of 128° C., the syrup was removed from the oven and 220 mg of dry Compound I powder was added. The powder was incorporated into the syrup by hand stirring. After a uniform dispersion had been achieved, the beaker was cooled by placing it momentarily into a vessel that contained water at ambient temperature and the stirring rate was increased. Once sucrose began to crystallize the beaker was removed from the cooling vessel. Vigorous agitation was continued as the mixture frothed up and sucrose continued to crystallize. After 30 seconds the material took the form granular agglomerates of fondant sized sucrose and Compound I. Aggregates were broken up with a mortar and pestle until product was passed through a 500 μm sieve.

Example 2: Co-Crystal of 5% Compound I and 95% Sucrose

Prepared as Example 1 except that 1.100 g of Compound I was added to the sucrose syrup.

Example 3: Co-Crystal of 10% Compound I and 90% Sucrose

Prepared as Example 1 except that 2.200 g of Compound I was added to the sucrose syrup.

Example 4: Co-Crystal of 5% Compound I and 94.4% Sucrose and 0.6% Sodium Acetate Prepared as Example 2 except that 0.1364 g of sodium acetate was dissolved in water along with the sucrose to constitute the starting syrup.

Example 5: Co-Crystal of 5% Compound I and 94.4% Sucrose and 0.6% Phosphate Dibasic Heptahydrate Prepared as Example 2 except that 0.1402 g of sodium phosphate dibasic heptahydrate was dissolved in water along with the sucrose to constitute the starting syrup.

Example 6: Co-Crystal of 5% Compound I and 94.6% Sucrose and 0.4% Sodium Hydroxide Prepared as Example 2 except that 2 mL of 1N sodium hydroxide solution was added to the concentrated syrup just prior to adding the Compound I.

Comparative Examples: Simple powder mixtures were prepared by placing measured quantities of dry granular sucrose and into a 4 dram glass vial. Physical mixtures were made by simply stirring the two powders with a spatula for 2 minutes.

Dissolution Measurements: The performance of the sucrose/Compound I co-crystallized product was compared to that of the Compound I starting material and sucrose/Compound I powder mixtures under standard conditions using a Distek 2100B USP 2 dissolution system. Sufficient amounts of each sample were added in order to create 20 ppm solutions of Compound I. These amounts were 20 mg of pure Compound I, 200 mg of the 10% mixtures, 400 mg of the 5% mixtures and 2.00 g of the 1% mixtures in 1 L of deionized water. A stirring rate of 200 rpm was used.

The concentration of Compound I in solution was monitored continuously as a function of time using a UV/Vis spectrometer probe which measured absorbance at 324 nm. Results selected at specific time points are provided in the tables below show that the amount of Compound I in solution increased more rapidly for the co-crystallized products than was the case for pure Compound I or the powder mixtures.

Evaluation: Comparison of the physical mixtures in Table 1 and the co-crystallized samples is shown in Table 2 and it demonstrates the enhanced rate of release that Compound I experiences when co-crystallized. The time to 50% dissolution of the 5% simple mixture was 29.3 minutes, which was more than 5 times as long as the time measured for the 5% co-crystallized sample, i.e., 50% dissolution of Example 2 is reached at 6.8 minutes.

Moreover, the surface of liquids to which co-crystallized powders were added was free of the flocks or specks that formed in the comparative samples.

Examples 1-3 have an appearance much like that of table sugar. Of the samples that contained pH modifying additives. Example 5 dissolved rapidly with a slight brown colour. As shown in Table 2 and FIG. 2, the dissolution rate of the simple powder mixtures depends on the Compound I to sucrose ratio. While dilute mixtures dissolve reasonably rapidly, those with 5% Compound I or more only reach 50% dissolution after ~30 minutes. Wetting and dispersing the fine Compound I powder improves its dissolution.

As shown in Table 1 and FIG. 1, the dissolution rate of the co-crystal samples was less sensitive to concentration. Dissolution was fast even with 1% and 5% Compound I. The 10% Compound I co-crystal dissolved slightly more slowly with 50% dissolution coming at 6.8 minutes.

As shown in Table I and FIG. 1, the 5% co-crystal sample dissolves much faster than the 5% simple mixture. Its dissolution profile is similar to the very dilute (0.06%) simple mixture.

Figure 2:
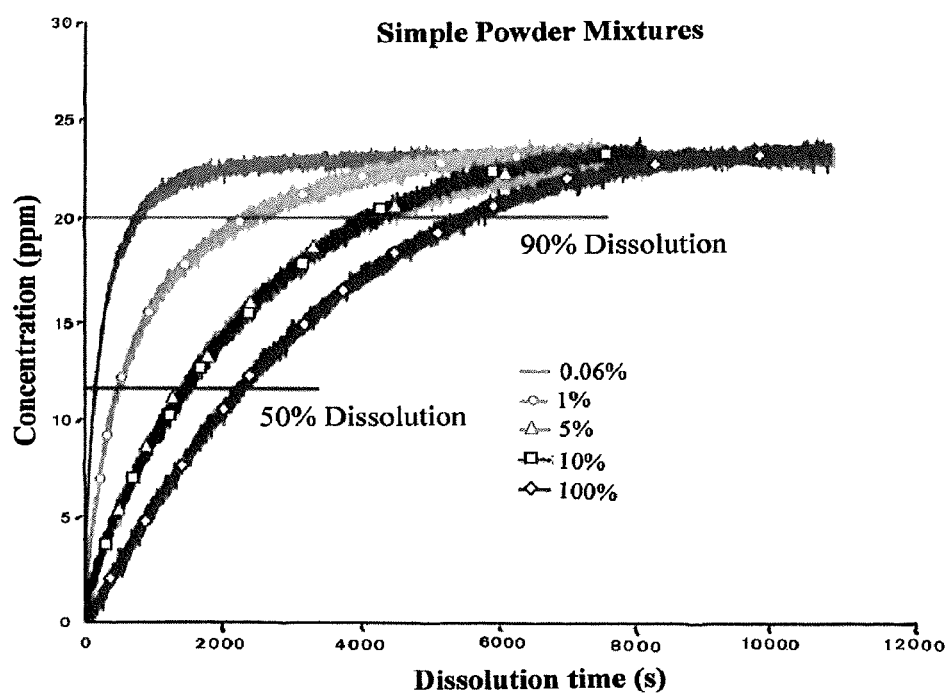
FIG. 2 is a graph showing the dissolution profiles of simple powder mixtures of Compound I of different concentrations.

The symbols provided on the graph of FIG. 1 and FIG. 2 are not meant to represent actual data points but are provided to allow identification of the various samples.

As shown in Table 1, additives such as base and basic salts were incorporated into the co-crystal structure. NaOH lead to a very fast initial dissolution (50% in <10 seconds). The sodium salts had less impact. The powder took on a slight brown colour when processed with these additives.

TABLE 1

Co-crystallized Sample

| | Concentration in solution (ppm) | | | | | |
|---|---|---|---|---|---|---|
| Time (min) | Example 1 | Example 2 | Example 3 | Example 4 | Example 5 | Example 6 |
| 0.083 | 2.2 | 0.4 | 0.7 | 0.9 | 0.7 | 8.6 |
| 2 | 12.0 | 10.1 | 6.2 | 11.2 | 7.0 | 14.4 |
| 5 | 16.3 | 15.9 | 11.0 | 17.1 | 12.9 | 17.1 |
| 10 | 19.5 | 19.5 | 15.3 | 21.1 | 18.0 | 18.5 |
| 25 | 22.6 | 22.3 | 19.7 | 23.4 | 22.9 | 19.6 |
| 50 | 23.6 | 23.3 | 21.3 | 24.6 | 23.5 | 20.2 |
| 100 | 24.3 | 23.6 | 23.3 | 24.8 | 24.1 | 20.5 |

TABLE 2

Comparative Samples

| | Concentration in solution (ppm) | | | |
|---|---|---|---|---|
| | Pure | Simple Powder Mixtures | | |
| Time (min) | 100% Compound I | 10% Compound I | 5% Compound I | 1% Compound I |
| 0.083333 | −0.5 | 0.8 | −0.3 | 1.1 |
| 2 | 0.4 | 1.9 | 2.4 | 4.9 |
| 5 | 1.4 | 3.8 | 4.3 | 9.2 |
| 10 | 3.5 | 5.9 | 6.8 | 12.9 |
| 25 | 8.3 | 11.8 | 11.6 | 18.3 |
| 50 | 14.5 | 17.8 | 17.4 | 21.0 |
| 100 | 20.9 | 22.2 | 22.6 | 23.1 |

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A process for forming a co-crystallized composition, wherein the process comprises the steps of:
    a. mixing a sugar with water with agitation in the presence of a base to form a sugar composition;
    b. heating the sugar composition to evaporate at least a portion of the water and form a sugar syrup;
    c. incorporating into the sugar syrup a dry powder of a sweetener to form a uniform dispersion, wherein the sweetener is 3-(4-amino-2,2-dioxide-1H-benzo[c][1,2,6]-thiadiazin-5-yloxy)-2',2'-dimethyl-N-propylpropanamide;
    d. removing the uniform dispersion from the heat; and
    e. allowing the uniform dispersion to cool with vigorous agitation to form a co-crystallized composition comprising the sugar and the sweetener.

2. The process of claim 1, wherein the sugar is selected from the group consisting of sucrose, fructose and glucose.

3. The process of claim 2, wherein the sugar is sucrose.

4. A method of sweetening a product, the method comprising by including the co-crystallized composition formed by the process of claim 1 in an amount effective to sweeten the product.

5. The method of claim 4, wherein the product is a beverage selected from the group consisting of carbonated soft drinks, powdered soft drinks, coffees, teas, juices, sweetened and flavored waters, sport/energy/health drinks, alcoholic beverages, beverages processed with heating and hot-filled packaging and cold-filled beverages.

6. The method of claim 4, wherein the product is a fluid dairy product selected from the group consisting of non-frozen, partially frozen and frozen milks, ice creams, sorbets and yogurts.

7. The method of claim 4, wherein the product is a condiment selected from the group consisting of ketchup, mayonnaise, salad dressing, Worcestershire sauce, tomato sauce, chili sauce, and mustard.

8. The method of claim 4, wherein the product is a baked good selected from the group consisting of cakes, cookies, pastries, breads and donuts.

9. The method of claim 4, wherein the product is a frosting.

10. The method of claim 4, wherein the product is a bakery filling of a low or neutral pH filling, a high, medium or low solids filling, a fruit or milk based filling, a hot or cold make-up filling and a non-fat to full-fat filling.

11. The method of claim 4, wherein the product is a candy or chewing gum.

12. The method of claim 4, wherein the product is a table-top sweetener.

13. A composition comprising the co-crystallized composition formed according to the process of claim 1.

14. The method of claim 1, further comprising sieve-screening the co-crystallized composition.

15. The method of claim 1, wherein the co-crystallized composition comprises from 1% to 5% of the sweetener, based on the weight of the co-crystallized composition.

* * * * *